No. 806,848. PATENTED DEC. 12, 1905.
E. SHAW.
APPARATUS FOR COOKING LIQUIDS.
APPLICATION FILED JUNE 7, 1904.

3 SHEETS—SHEET 1.

Witnesses.
W. Henry Simms
C. P. Gurney.

Inventor
E. Shaw
by Lloyd Wise
Attorney

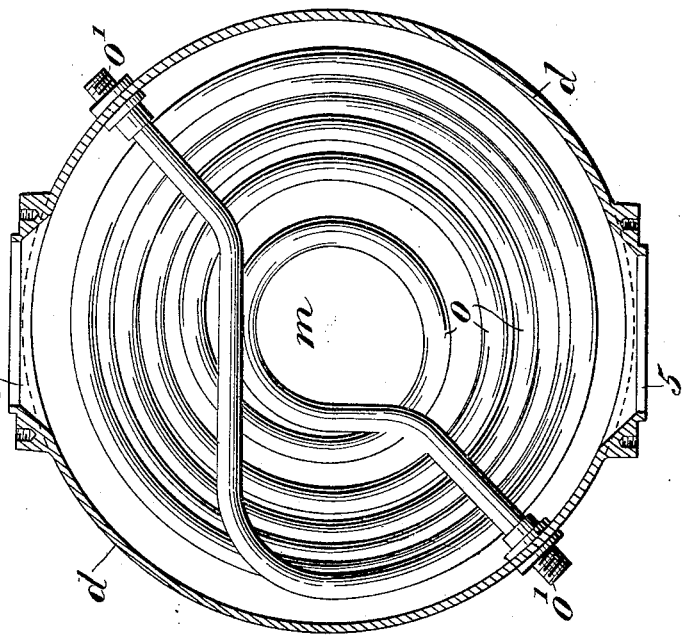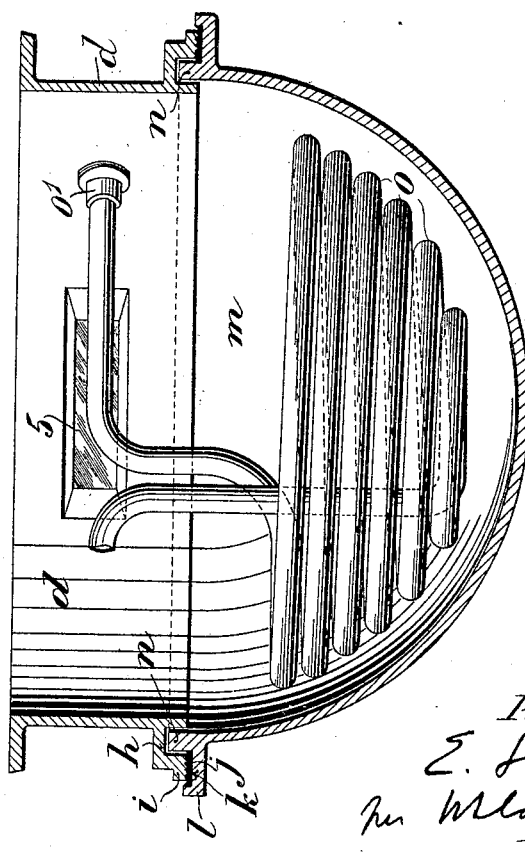

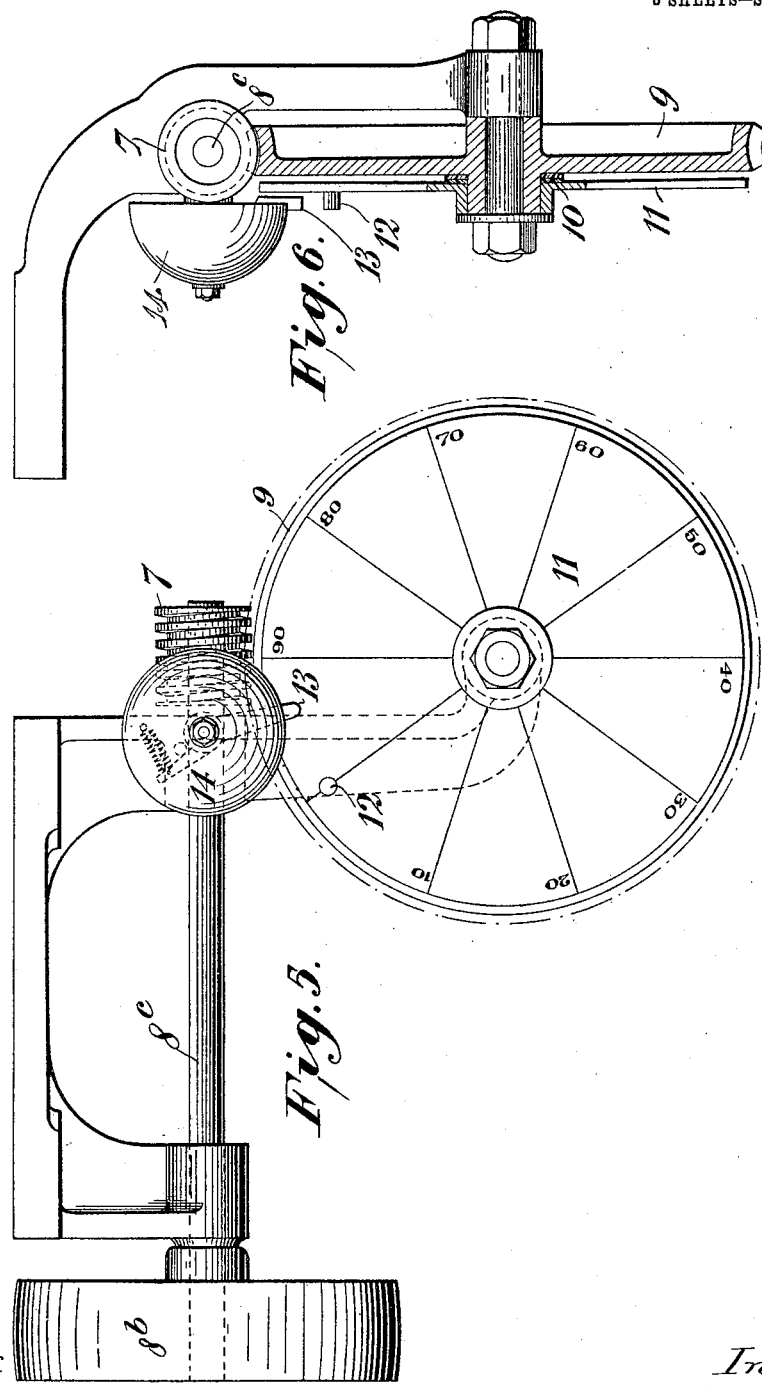

UNITED STATES PATENT OFFICE.

EDWARD SHAW, OF LONDON, ENGLAND.

APPARATUS FOR COOKING LIQUIDS.

No. 806,848.  Specification of Letters Patent.  Patented Dec. 12, 1905.

Application filed June 7, 1904. Serial No. 211,558.

*To all whom it may concern:*

Be it known that I, EDWARD SHAW, a subject of the King of Great Britain and Ireland, residing in the city of London, England, have invented Improvements in Apparatus for Cooking, Concentrating, and Evaporating Liquids, of which the following is a specification.

This invention has reference to improvements in apparatus comprising an externally-heated tube through which the liquid to be treated is fed continuously by means of a pump, a collecting-chamber into which said tube discharges, and means, such as an air or vapor pump, for removing the vapor from the collecting-chamber and for maintaining a low pressure in the said chamber and the externally-heated tube, the treated liquid being discharged separately. When treating some liquids, the concentrated or cooked material is liable to thicken and adhere to the sides and bottom of the collecting-chamber of such apparatus, which adhering material has had to be removed from time to time by passing water through the apparatus, thus involving considerable delay and waste.

According to this invention the apparatus is provided with a collecting-chamber which, or a portion of which, is readily removable, so that its interior can be easily and efficiently cleaned and can be readily replaced in position and the chamber made air-tight.

In order that the treated material may be removed in batches of approximately equal weight, the apparatus is provided with automatic signaling means adapted to indicate when a certain quantity of liquid has been pumped through the apparatus.

Figure 1:
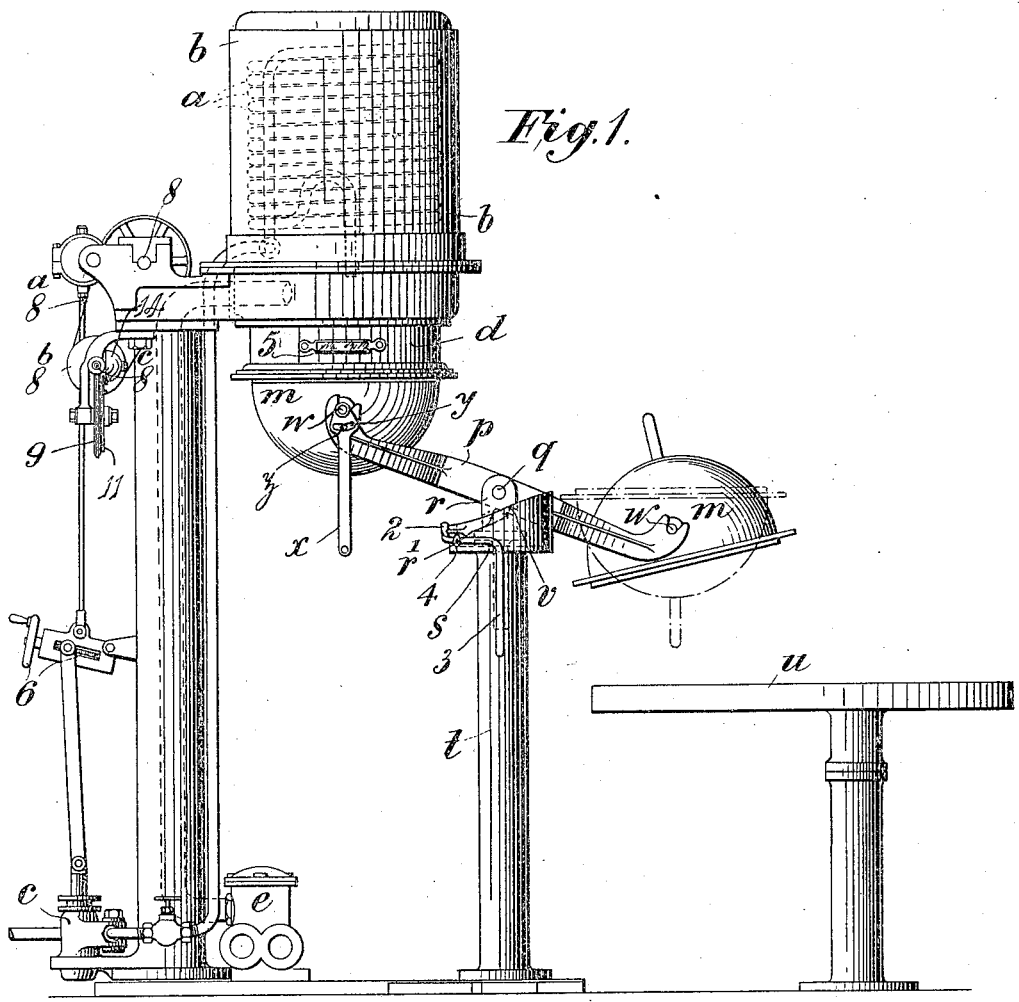
Figure 2:
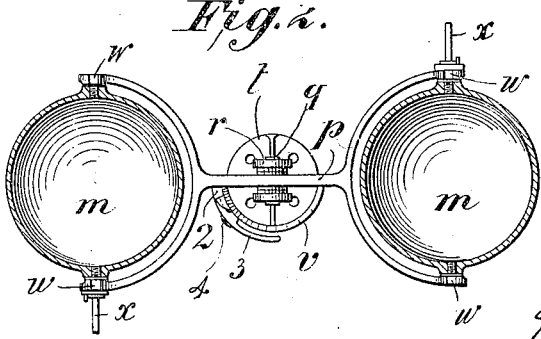

The accompanying illustrative drawings show a construction of apparatus according to this invention, Figure 1 being a side elevation; Fig. 2, a sectional plan of a portion thereof; Figs. 3 and 4, respectively, a vertical section and horizontal section of the collecting-chamber to a larger scale than that of Figs. 1 and 2; and Figs. 5 and 6 front elevation and sectional end elevation of a signaling arrangement.

$a$ is the coiled tube; $b$, the steam-chamber in which it is located; $c$, the syrup-pump; $d$, the collecting-chamber, and $e$ the vacuum-pump connected therewith.

In the example illustrated the body $d$ of the collecting-chamber is of tubular or cylindrical form with open bottom, whose lower edge is formed with an annular recess $h$, and the lower face of the ring-like outer wall $i$ of this recess is serrated and adapted to make an air-tight joint with a ring of rubber or the like material $j$, located in a groove $k$, formed in a flange $l$ near the upper end of a removable hemispherical vessel $m$, forming the bottom of the collecting-chamber, the edge $n$ of the bottom vessel $m$ projecting above the flange $l$ and into the recess $h$ of the tubular body $d$. Sometimes, as in the apparatus shown, for the purpose of applying extra heat to the liquid contents the collecting-chamber is fitted with a steam-coil $o$, of copper tube, arranged within the bottom vessel $m$ and the inlet and outlet ends of which are connected to unions $o'$, that pass through the wall of the tubular body $d$. In order to economize time in working the apparatus, the collecting-chamber is provided with two such removable bottom vessels $m$, pivoted one to each end of a lever $p$, that is fulcrumed at $q$ to a pin $r$, mounted to rotate in a vertical bearing $s$, formed at the upper end of a column or support $t$, located near the steam-chamber $b$, the arrangement being such that when one bottom vessel $m$ is in position below the collecting-chamber body $d$ the other bottom vessel $m$ is in a position convenient for emptying its contents, it may be, onto a cooling-tube $u$ and, if necessary, for wiping or otherwise cleaning its inner surface. Stops or faces $r'$ on the pin $r$ limit the downward movement of either arm of the lever.

The upper end of the supporting-column $t$ is preferably formed with a cam-surface $v$, on which the arm of the lever $p$, carrying the charged bottom vessel $m$, bears when the said vessel is moved away from the collecting-chamber body $d$, which is effected by pressing upwardly the opposite end of the lever, so as to break the joint between the bottom vessel $m$ and the body $d$ after having stopped the syrup-pump $c$ and vacuum-pump $e$ of the apparatus. The shape of the cam $v$ is such that as the lever $p$ is slued round on the supporting-column $t$ the charged vessel $m$, after clearing the depending steam-heating coil $o$, gradually rises until the empty bottom vessel $m$ at the other end of the lever $p$ has assumed a position immediately under the collecting-chamber body $d$, when the charged vessel drops suddenly, thereby bringing the empty vessel with some force into position for use, pressure of the external atmosphere retaining it in position when the vacuum-pump $e$ is in action.

One trunnion-pin $w$ of each vessel $m$ is fitted with a hand-lever $x$ for convenience in discharging the contents. To normally limit the tipping of the vessels $m$, while leaving them free to adjust themselves to their seats, the hand-levers $x$ are each formed with an arc-shaped slot $y$, through which a pin $z$ passes into a hole formed in the corresponding end of the carrying-lever $p$.

To prevent the carrying-lever $p$ being slued too far around the supporting-column $t$, a removable stop 2 is provided. Conveniently, as shown, the stop is formed on one end of a weighted lever 3, pivoted at 4 to the column $t$ and normally located in position to arrest the horizontal movement of the lever $p$.

5 is a glazed peep-hole in the tubular body $d$.

Each vessel $m$ may be provided with a removable copper bowl, so that when removed from the body $d$ a charged bowl can be removed and an empty bowl inserted in its place.

The liquid-supply pump $c$ may, as is usual in apparatus of the kind referred to, be provided with adjusting-gear 6, whereby its stroke is regulated, and in order that the liquid may be treated in charges of a definite weight there is provided a signaling arrangement, such as a worm 7, driven by a belt $8^a$, belt-pulley $8^b$, and shaft $8^c$, from the pump-driving shaft 8, and a worm-wheel 9, that gears into the worm 7 and drives through friction-washers 10 a disk 11, that is mounted on its boss. The disk 11 is provided with a projecting pin 12, adapted to come in contact with the operating-arm 13 of a gong 14 when the disk is rotated, so that an audible signal is given when the pump $c$ has been working a certain time, and consequently a certain quantity or weight of liquid has been forced through the heated coil $a$. In order to regulate the time at which the signal is to be given, according to the quantity or weight of syrup required in a batch, the face of the disk 11 is marked with radial lines and with numbers that indicate the number of teeth on the worm-wheel 9, corresponding to the relative positions of the radial lines in relation to the pin 12, so that if, for example, it is desired that the gong 14 should be sounded when the worm-wheel 11 has been rotated by the worm 7, say, forty teeth the disk 11 is moved round until the radial line indicating "40" is in line with the arm 13 of the gong. The arrangement will then be such that when the worm-wheel has been driven forty teeth the disk-pin 12 will come in contact with the gong-operating arm 13.

What I claim is—

1. In apparatus for cooking, concentrating and evaporating liquids, the combination of an externally-heated tube, means for forcing liquid therethrough, a chamber, into which said tube discharges, having a body portion with open bottom and a removable bottom portion adapted to be readily connected to the body portion in an air-tight manner, and means for maintaining a low pressure in said chamber, as set forth.

2. In apparatus for cooking, concentrating and evaporating liquids, the combination of an externally-heated tube, means for forcing liquid therethrough, an open-bottomed tubular body into which said tube discharges, a hemispherical vessel removably connected in an air-tight manner to the open bottom of said tubular body and means for maintaining a low pressure in said chamber, as set forth.

3. In apparatus for cooking, concentrating and evaporating liquids, the combination of an externally-heated tube, means for forcing liquid therethrough, an open vessel formed with a grooved external flange, a packing-ring of resilient material located in the groove of said flange, a collecting-chamber into which said tube discharges and comprising a tubular body, the lower edge of said body being formed with an annular recess the lower face of the ring-like outer wall of which is adapted to make an air-tight joint with the said packing-ring of said open vessel, and means for maintaining a low pressure in the said collecting-chamber, as set forth.

4. In apparatus for cooking, concentrating, and evaporating liquids, the combination of an externally-heated tube, means for forcing liquid therethrough, a hemispherical vessel formed with a grooved external flange near its upper end, a ring of rubber located in said groove, a collecting-chamber into which said tube discharges and comprising a cylindrical tubular body with open bottom, the lower edge of said body being formed with an annular recess, the lower face of the ring-like outer wall of which is serrated and adapted to make an air-tight joint with the said rubber ring, and means for maintaining a low pressure in said collecting-chamber, as set forth.

5. In apparatus for cooking, concentrating and evaporating liquids, the combination of an externally-heated tube, means for forcing liquid therethrough, a body to which the discharge end of said tube is connected, collecting vessels, means for supporting same and carrying them to and from a charging position below the discharge end of said tube, means for connecting either of said vessels in an air-tight manner to said body and means whereby a low pressure is then maintained in said vessel, as set forth.

6. In apparatus for cooking, concentrating, and evaporating liquids, the combination of an externally-heated tube, means for forcing liquid therethrough, a support adapted to rotate in a vertical sense, a lever fulcrumed midway between its ends to said support, a pair of open vessels mounted one on each end of said lever, an open-bottomed tubular body into which said tube discharges, means whereby either of said vessels can be connected in an air-tight manner to the open bottom of said tubular body, and means whereby a low pressure is maintained in the chamber formed by said tubular body and either of said vessels when connected thereto, as set forth.

7. In apparatus for cooking, concentrating, and evaporating liquids, the combination of an externally-heated tube, means for forcing liquid therethrough, a support provided with a vertical bearing, a headed pin mounted in said bearing, a lever fulcrumed midway between its ends to the head of said pin, a pair of vessels trunnioned one to each end of said lever and each formed with a grooved external flange, two rubber rings located one in each of said grooves, a collecting-chamber into which said tube discharges, and comprising a cylindrical tubular body with open bottom, the lower edge of said body being formed with an annular recess, the lower face of the ring-like outer wall of which is adapted to make an air-tight joint with the said rubber ring of either vessel, and means whereby a low pressure is maintained in the collecting-chamber, as set forth.

8. In apparatus for cooking, concentrating, and evaporating liquids, the combination of an externally-heated tube, means for forcing liquid therethrough, a support provided with a vertical bearing, a headed pin mounted in said bearing, a lever fulcrumed midway between its ends to the head of said pin, a pair of vessels trunnioned one to each end of said lever and each formed with a grooved external flange, two rubber rings located one in each of said grooves, a collecting-chamber into which said tube discharges, and comprising a cylindrical tubular body with open bottom, the lower edge of said body being formed with an annular recess, the lower face of the ring-like outer wall of which is adapted to make an air-tight joint with the said rubber ring of either vessel, a removable pivoted stop arranged to arrest the horizontal movement of said lever, and means whereby a low pressure is maintained in the collecting-chamber, as set forth.

9. In apparatus for cooking, concentrating, and evaporating liquids, the combination of an externally-heated tube, means for forcing liquid therethrough, a support provided with a vertical bearing, a headed pin mounted in said bearing, a lever formed with a hole near each end and fulcrumed midway between its ends to the head of said pin, a pair of vessels trunnioned one to each end of said lever and each formed with a grooved external flange, two rubber rings located one in each of said grooves, a pair of hand-levers one secured to one of the trunnion-pins of each hemispherical vessel and each formed with an arc slot, two pins each adapted to pass through the arc slot of either said hand-lever and into the hole at the corresponding end of said pivoted lever, a collecting-chamber into which said tube discharges, and comprising a cylindrical tubular body with open bottom, the lower edge of said body being formed with an annular recess, the lower face of the ring-like outer wall of which is adapted to make an air-tight joint with the said rubber ring of either vessel, a steam-heating coil arranged to extend within either hemispherical vessel and the inlet and outlet ends of which are connected to and pass through the wall of said tubular body, a removable pivoted stop arranged to arrest the horizontal movement of said lever, and means whereby a low pressure is maintained in the collecting-chamber, as set forth.

10. In apparatus for cooking, concentrating, and evaporating liquids, the combination of an externally-heated tube, means for forcing liquid therethrough, a support provided with a vertical bearing, a headed pin mounted in said bearing, a lever fulcrumed midway between its ends to the head of said pin, a pair of vessels trunnioned one to each end of said lever and each formed with a grooved external flange, two rubber rings located one in each of said grooves, a collecting-chamber into which said tube discharges, and comprising a cylindrical tubular body, with open bottom, the lower edge of said body being formed with an annular recess, the lower face of the ring-like outer wall of which is adapted to make an air-tight joint with the said rubber ring of either vessel, a stop arranged to arrest the horizontal movement of said lever, and means whereby a low pressure is maintained in the collecting-chamber, as set forth.

11. In apparatus for cooking, concentrating and evaporating liquids, the combination of an externally-heated tube, means for forcing liquid therethrough, a chamber, into which said tube discharges, and formed with a readily-removable portion, a steam-heating coil arranged within said chamber and means for maintaining a low pressure in the said chamber, as set forth.

12. In apparatus for cooking, concentrating and evaporating liquids, the combination of an externally-heated tube, means for forcing liquid therethrough, a chamber, into which said tube discharges, formed with a readily-removable portion, a steam-heating coil arranged within said chamber and the inlet and outlet ends of which are connected to and extend through the wall of the stationary portion thereof, and means for maintaining a low pressure in the said chamber, as set forth.

13. In apparatus for cooking, concentrating, and evaporating liquids, the combination of an externally-heated tube, means for forcing liquid therethrough, a readily-removable chamber into which said tube discharges, a steam-heating coil arranged within said chamber and means for maintaining a low pressure in the said chamber, as set forth.

14. In apparatus for cooking, concentrating, and evaporating liquids, the combination of an externally-heated tube, means for forcing liquid therethrough, a collecting-chamber into which said tube discharges and comprising an open-bottomed tubular body, a hemispherical vessel removably connected in an air-tight manner to the open bottom of said tubular body, a steam-heating coil arranged to extend within said hemispherical vessel and the inlet and outlet ends of which are connected to and pass through the wall of said tubular body and means for maintaining a low pressure in the said chamber, as set forth.

15. In apparatus for cooking, concentrating, and evaporating liquids, the combination of an externally-heated tube, means for forcing liquid therethrough, an open vessel formed with a grooved external flange near its upper end, a packing-ring of resilient material located in the groove of said flange, a collecting-chamber into which said tube discharges, and comprising an open-bottomed tubular body, the lower edges of said body being formed with an annular recess the lower face of the ring-like outer wall of which is adapted to make an air-tight joint with the said packing-ring of said open vessel, a steam-heating coil arranged to extend within said vessel and the inlet and outlet ends of which are connected to and pass through the wall of said tubular body and means for maintaining a low pressure in the said chamber, as set forth.

16. In apparatus for cooking, concentrating, and evaporating liquids, the combination of an externally-heated tube, means for forcing liquid therethrough, a support provided with a vertical bearing, a headed pin mounted in said bearing, a lever formed with a hole near each end and fulcrumed midway between its ends to the head of said pin, a pair of vessels trunnioned one to each end of said lever and each formed with a grooved external flange, two rubber rings located one in each of said grooves, a pair of hand-levers one secured to one of the trunnion-pins of each hemispherical vessel and each formed with an arc slot, two pins each adapted to pass through the arc slot of either said hand-lever and into the hole at the corresponding end of said pivoted lever, a collecting-chamber into which said tube discharges, and comprising a cylindrical tubular body with open bottom, the lower edge of said body being formed with an annular recess, the lower face of the ring-like outer wall of which is adapted to make an air-tight joint with the said rubber ring of either vessel, a steam-heating coil arranged to extend within either hemispherical vessel and the inlet and outlet ends of which are connected to and pass through the wall of said tubular body, a cam on the upper end of said supporting-column on which said lever is arranged to bear, a removable pivoted stop arranged to arrest the horizontal movement of said lever, means whereby a signal is given when a certain quantity or weight of liquid has passed through the heated tube, and means whereby a low pressure is maintained in the collecting-chamber, as set forth.

17. In apparatus for cooking, concentrating, and evaporating liquids, the combination of an externally-heated tube, means for forcing liquid therethrough, a support provided with a vertical bearing, a headed pin mounted in said bearing, a lever formed with a hole near each end and fulcrumed midway between its ends to the head of said pin, a pair of vessels trunnioned one to each end of said lever and each formed with a grooved external flange, two rubber rings located one in each of said grooves, a pair of hand-levers one secured to one of the trunnion-pins of each hemispherical vessel and each formed with an arc slot, two pins each adapted to pass through the arc slot of either said hand-lever and into the hole at the corresponding end of said pivoted lever, a collecting-chamber into which said tube discharges, and comprising a cylindrical tubular body with open bottom, the lower edge of said body being formed with an annular recess, the lower face of the ring-like outer wall of which is adapted to make an air-tight joint with the said rubber ring of either vessel, a cam on the upper end of said supporting-column on which said lever is arranged to bear, a removable pivoted stop arranged to arrest the horizontal movement of said lever, and means whereby a low pressure is maintained in the collecting-chamber, as set forth.

18. In apparatus for cooking, concentrating, and evaporating liquids, the combination of an externally-heated tube, means for forcing liquid therethrough, a support provided with a vertical bearing, a headed pin mounted in said bearing, a lever formed with a hole near each end and fulcrumed midway between its ends to the head of said pin, a pair of vessels trunnioned one to each end of said lever and each formed with a grooved external flange, two rubber rings located one in each of said grooves, a pair of hand-levers one secured to one of the trunnion-pins of each hemispherical vessel and each formed with an arc slot, two pins each adapted to pass through the arc slot of either said hand-lever and into the hole at the corresponding end of said pivoted lever, a collecting-chamber into which said tube discharges, and comprising a cylindrical tubular body with open bottom, the lower edge of said body being formed with an annular recess, the lower face of the ring-like outer wall of which is adapted to make an air-tight joint with the said rubber ring of either vessel, a steam-heating coil arranged to extend within either hemispherical vessel and the inlet and outlet ends of which are connected to and pass through the wall of said tubular body, a cam on the upper end of said supporting-column on which said lever is arranged to bear, a removable pivoted stop arranged to arrest the horizontal movement of said lever, and means whereby a low pressure is maintained in the collecting-chamber, as set forth.

19. In apparatus for cooking, concentrating, and evaporating liquids, the combination of an externally-heated tube, means for forcing liquid therethrough, a collecting-chamber into which said tube discharges, means for maintaining a low pressure in said collecting-chamber and means for indicating when a definite charge or weight of liquid has passed through said tube, as set forth.

20. In apparatus for cooking, concentrating, and evaporating liquids, the combination of an externally-heated tube, means for forcing liquid therethrough, a collecting-chamber into which said tube discharges, and means for indicating when a definite charge or weight of liquid has passed through said tube, as set forth.

21. In apparatus for cooking, concentrating, and evaporating liquids, the combination of an externally-heated tube, means for forcing liquid therethrough, a collecting-chamber into which said tube discharges, means whereby an indication is given when a definite charge or weight of liquid has passed through said tube, and means for actuating said liquid-forcing means and said signaling means, as set forth.

22. In apparatus for cooking, concentrating, and evaporating liquids, the combination of an externally-heated tube, means for forcing liquid therethrough, a collecting-chamber into which said tube discharges, a gong and means for sounding said gong when a definite charge or weight of liquid has passed through said tube, as set forth.

23. In apparatus for cooking, concentrating, and evaporating liquids, the combination of an externally-heated tube, means for forcing liquid therethrough, a collecting-chamber into which said tube discharges, means for actuating said liquid-forcing means, a shaft driven therefrom, a worm on said shaft, a worm-wheel that gears into said worm, a disk mounted on the boss of said worm-wheel and frictionally driven from said worm-wheel, a pin projecting from said disk, and a gong adapted to be operated by said pin, the face of said disk being marked with radial lines and numbers that indicate the number of teeth on the said worm-wheel in relation to said pin, as set forth.

24. In apparatus for cooking, concentrating, and evaporating liquids, the combination of an externally-heated tube, means for forcing liquid therethrough, a collecting-chamber into which said tube discharges, means for actuating said liquid-forcing means, a rotary disk frictionally driven therefrom, a pin projecting from said disk and a gong adapted to be operated by said pin, as set forth.

25. In apparatus for cooking, concentrating, and evaporating liquids, the combination of an externally-heated tube, means for forcing liquid therethrough, a chamber, into which said tube discharges, formed with a readily-removable portion, and means for indicating when a definite charge or weight of liquid has passed through said tube, as set forth.

26. In apparatus for cooking, concentrating, and evaporating liquids, the combination of an externally-heated tube, means for forcing liquid therethrough, a chamber, into which said tube discharges, formed with a readily-removable portion, means for maintaining a low pressure in the said chamber, and means for indicating when a definite charge or weight of liquid has passed through said tube, as set forth.

27. In apparatus for cooking, concentrating, and evaporating liquids, the combination of an externally-heated tube, means for forcing liquid therethrough, a readily-removable chamber into which said tube discharges, and means for indicating when a definite charge or weight of liquid has passed through said tube, as set forth.

28. In apparatus for cooking, concentrating, and evaporating liquids, the combination of an externally-heated tube, means for forcing liquid therethrough, a readily-removable chamber into which said tube discharges, means for maintaining a low pressure in the said chamber, and means for indicating when a definite charge or weight of liquid has passed through said tube, as set forth.

Signed at London, England, this 14th day of May, 1904.

EDWARD SHAW.

Witnesses:
H. D. JAMESON,
A. NUTTING.